Dec. 15, 1964   E. A. KOSKI ETAL   3,161,282
ROPE-SUSPENDED, SKID-MOUNTED, MOVABLE BELT CONVEYOR
Filed July 27, 1961   3 Sheets-Sheet 1
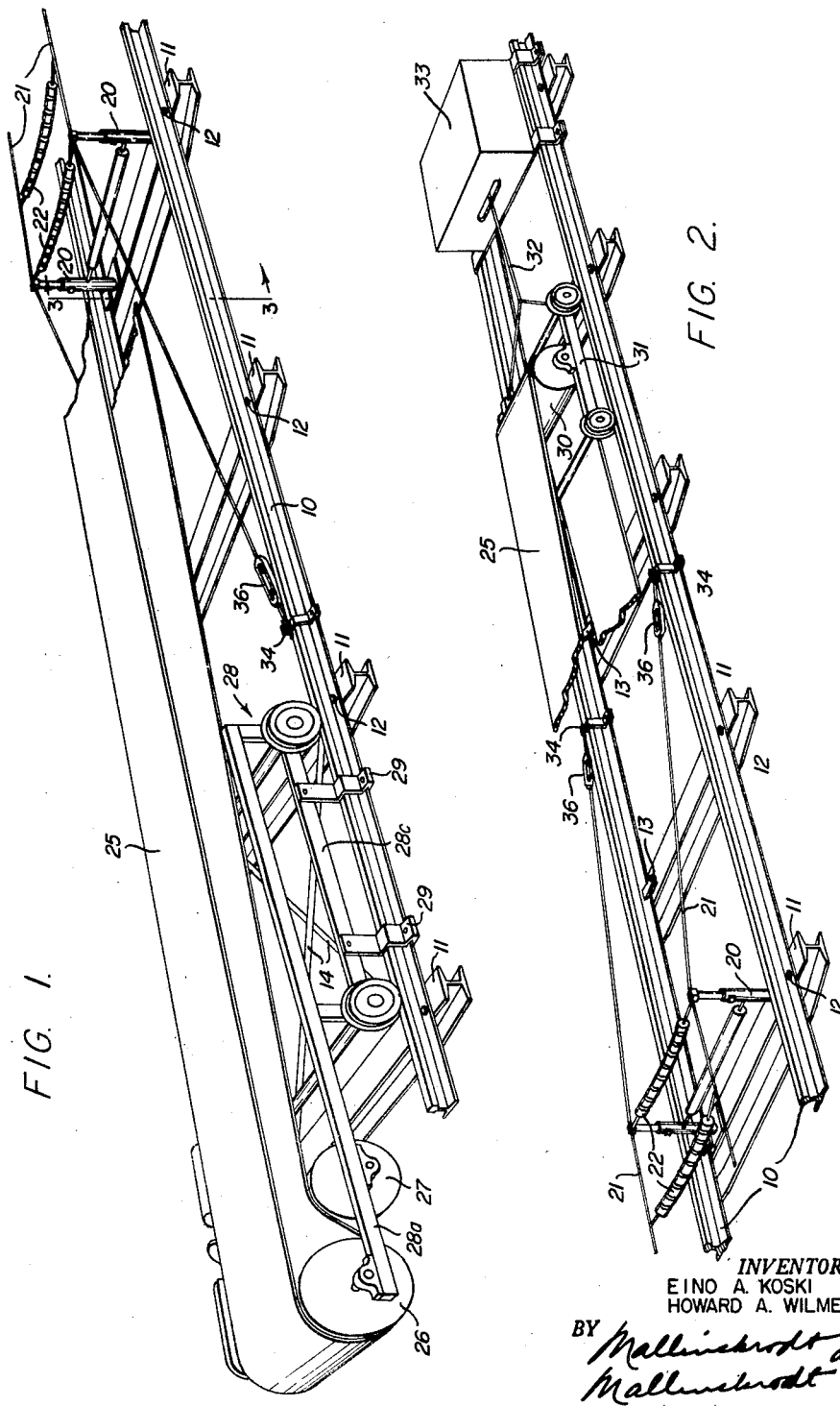
INVENTOR.
EINO A. KOSKI
HOWARD A. WILMETH
BY Mallinckrodt and Mallinckrodt
ATTORNEYS Dec. 15, 1964        E. A. KOSKI ETAL         3,161,282
ROPE-SUSPENDED, SKID-MOUNTED, MOVABLE BELT CONVEYOR
Filed July 27, 1961                      3 Sheets-Sheet 2
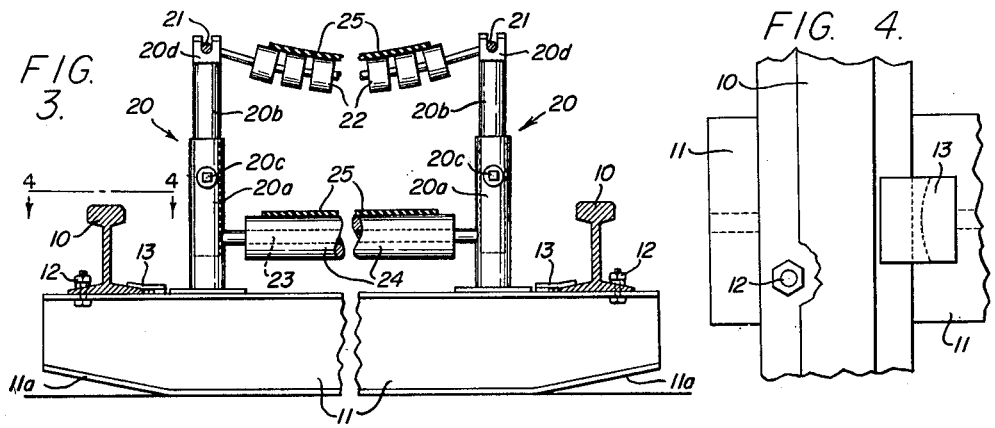
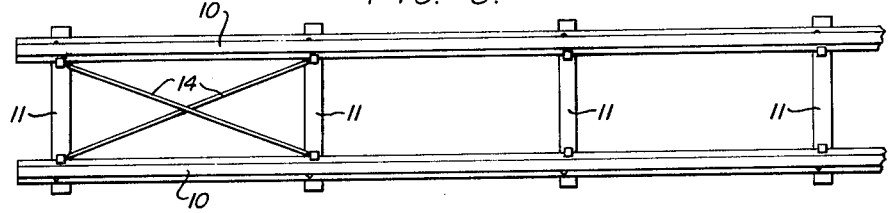
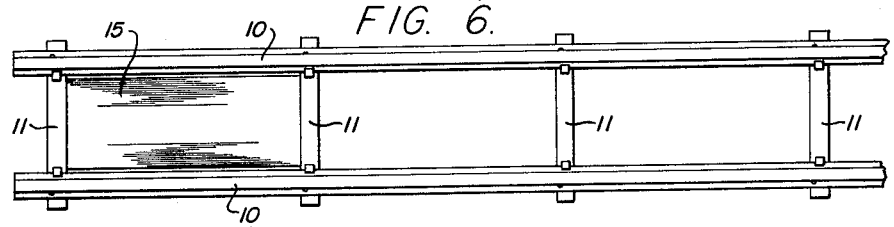
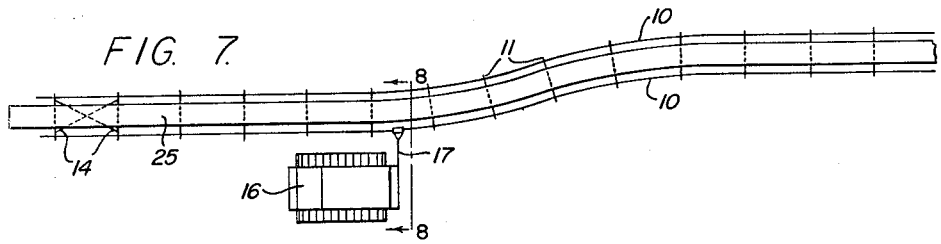
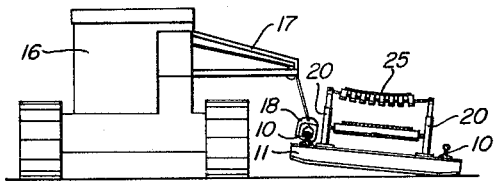
*INVENTOR.*
EINO A. KOSKI
HOWARD A. WILMETH
BY *Mallinckrodt
Mallinckrodt*
ATTORNEYS

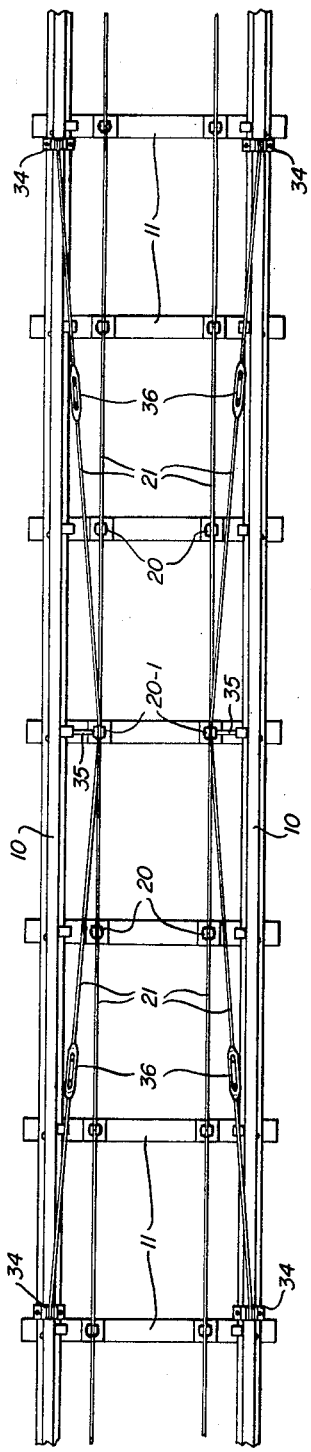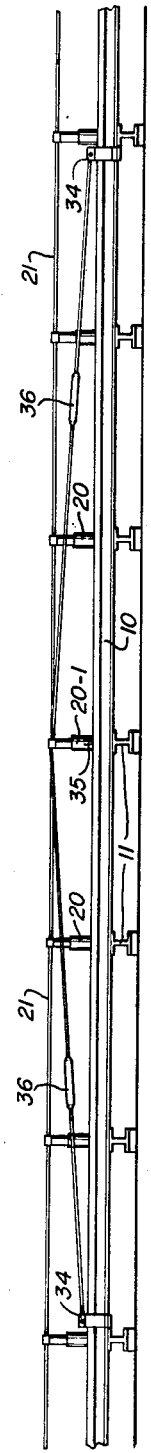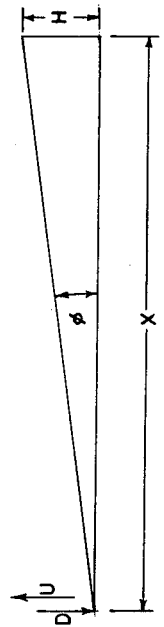

United States Patent Office 3,161,282
Patented Dec. 15, 1964

3,161,282
ROPE-SUSPENDED, SKID-MOUNTED, MOVABLE BELT CONVEYOR
Eino A. Koski and Howard A. Wilmeth, both of Silver City, N. Mex., assignors to Kennecott Copper Corporation, New York, N.Y., a corporation of New York
Filed July 27, 1961, Ser. No. 127,315
7 Claims. (Cl. 198—192)

This invention relates to endless belt conveyors as commonly employed in the mining, quarrying, and construction industries, and particularly to those arranged to be shifted laterally from time to time along their lengths as required by progress of the work being performed.

There are many instances, particularly in mining and quarrying, where it is necessary to shift an endless belt conveyor laterally along its length in order to stay within working range of an excavating loader, such as a power shovel, as it digs farther and farther into the side of a mountain along an extended face cut for example. While special conveyor systems have been heretofore provided for use in these instances, see Wirtschafts Patent No. 1,454 (East Germany July 21, 1952), this invention is concerned with providing an improved shiftable conveyor system employing a rope-suspended type of endless belt conveyor.

Rope-suspended, endless belt conveyors have certain advantages over less flexible types, yet it is necessary that the wire rope or cables used to mount the belt-supporting idlers be themselves properly supported, without such twisting as would interfere with tensioning.

Accordingly, it was a principal object of this invention to construct a movable, rope-suspended, belt conveyor system which would be practical and would perform satisfactorily despite repeated shiftings from side to side along its length under the rigorous conditions existing in use.

We accomplished this object by utilizing a skid-mounted shiftable track, at least corresponding in length with the length of the conveyor and embodying pivotally interconnected ties and rails. In accordance with the invention, adjacent ties at one end of the track are rigidly interconnected against relative movement to insure return of track and ties to essentially their original alignment following any given shifting of the system. The wire ropes are carried by standards which are rigidly secured to the ties, thereby insuring proper re-alignment for both wire ropes and conveyor belt following any shift of the conveyor.

An important feature of our conveyor system is the manner in which the ends of the wire rope are anchored. Thus, in order to overcome vertical components of force which tend to lift the conveyor at the anchor points during operation under load, such anchor points are located such distance from the adjacent standards carrying the wire rope that the downwardly directed vertical force component attributable to conveyor weight exceeds the upwardly directed vertical force component attributable to the conveyed load. Such distance is a function of rope tension, weight of the structural components of the system, and height of the rope-carrying standards, and is determined by calculation in each instance.

A specific embodiment of the generic concepts involved, representing what is presently regarded as the best mode of carrying out the invention in actual practice, is illustrated in the accompanying drawings.

In the drawings:

FIG. 1 represents, in perspective, the head end portion of a movable, rope-suspended, belt conveyor system conforming to the invention;

FIG. 2, the tail end portion;

FIG. 3, a vertical section taken on the line 3—3 of FIG. 1 and drawn to a larger scale, intermediate portions being broken out for convenience of illustration;

FIG. 4, a fragmentary plan view taken from the standpoint of the line 4—4, FIG. 3;

FIG. 5, a fragmentary plan view of the track at the head end of the conveyor system of FIG. 1 to show the rigid connection between adjacent ties;

FIG. 6, a similar view showing an alternative arrangement;

FIG. 7, a schematic plan view drawn to a considerably smaller scale showing the conveyor system being moved laterally along its length by a dozer;

FIG. 8, a vertical section taken along the line 8—8 of FIG. 7 and drawn to a somewhat larger scale;

FIG. 9, a fragmentary plan view showing an intermediate portion of the conveyor at a wire-rope-anchoring location;

FIG. 10, a view corresponding to that of FIG. 9 but in side elevation; and

FIG. 11, a force diagram used in calculating anchoring locations for the idler-suspending wire ropes.

Referring to the drawings:

In the illustrated construction, the length of track supporting the conveyor is made up of standard rails 10 secured to a series of widely spaced ties 11 in the form of structural steel H-beams modified at their ends by cutting, bending, and welding, see 11a, FIG. 3, to form skids for facilitating shifting of the track laterally. The track is of any appropriate length for the work concerned, e.g. several thousand feet, and the spacing of ties in the order of ten feet, more or less.

The securement of rails to ties is pivotal to permit relative movement during track shifting. Thus, see particularly FIG. 4, bolts 12 passing through one base flange of the rails and a flange of the ties are sufficiently free to serve as pivot pins, while clips 13 fastened to the ties hold the other base flange of the rails firmly against the ties without preventing the aforesaid relative movement.

An important feature is the rigid tying together of adjacent ties at one end of the track structure, so that both ties and rails will return to their original alignment following track shifting. Thus, as shown in FIGS. 1 and 5, cross bracing 14 is rigidly secured to mutually adjacent ties 11 at the head end of the track structure. An alternative arrangement is shown in FIG. 6, where a steel plate 15 is welded along its end margins to the mutually adjacent ties 11.

The track structure is shifted laterally by any suitable means, preferably a dozer 16, FIGS. 7 and 8, having an outrigger structure 17 carrying a grab device 18 for seizing one of the rails 10 and sliding along its length as the dozer moves ahead parallel with the track structure after having shifted it laterally the desired distance at one of its ends. This method of shifting a track structure is not new, so neither it nor the grab device 18 need be described in greater detail.

The rope-suspended, belt conveyor is integrated with the aforedescribed track structure by mounting the idler supports on the ties 11, anchoring the wire ropes to either the ties or rails at appropriate intervals along the length of the track, e.g. 250 ft., and, preferably, mounting head and tail mechanisms on respective wheeled carriages arranged to ride the rails for convenience in the making of adjustments as and when necessary, e.g. following shifting.

Thus, as illustrated in FIGS. 1–3, wire-rope-supporting standards 20 are rigidly secured to the ties 11 as by welding, or, if positional adjustment along the lengths of the individual ties is desired, by bolting in some suitable manner (not shown) permitting such adjustment.

In the form shown, FIG. 3, each standard 20 is made up of a length of pipe 20a, having its lower end secured to the tie and its upper end open for the concentric sliding reception of a length of pipe 20b arranged for height adjustability, as by means of a locking set screw 20c. A conventional retaining member 20d of U-formation for receiving and guiding the wire ropes 21 used to suspend belt-troughing idlers 22, is secured as by welding to the upper end of pipe 20b. Pairs of these standards 20 on the respective ties 11 are rigidly interconnected by respective crosspieces 23, which are preferably lengths of pipe on which are journaled respective rollers 24 serving as supporting idlers for the return run of the conveyor belt 25. The idlers 22 may be of any suitable type, those shown being a standard commercial product.

Both the head and tail sections of the conveyor are essentially conventional in construction and function, although their track mounting in the combination constituting this invention is unique and is the preferred arrangement.

As illustrated in FIG. 1, head pulleys 26 and 27 are rotatably mounted in the framework 28a of a head carriage 28, which has a wheeled undercarriage 28b arranged to ride the rails 10 of the movable track. Such carriage is normally secured firmly in adjusted position on the track by means of anchor pieces 29 bolted to the undercarriage 28b and to the rails 10.

As illustrated in FIG. 2, tail pulley 30 is rotatably mounted in a wheeled tail carriage 31, which is subject to the pulling action of tensioning cable 32 extending from a conventional tensioning unit 33 slidably mounted on but normally bolted to the rails 10 of the track in appropriate adjusted position. Conventional means (not shown) are provided for rotating tail pulley 30 as a drive for conveyor belt 25.

Following any lateral shifting of the track and track-mounted conveyor as aforedescribed, appropriate readjustments may be made in conveyor belt mounting by unfastening either head carriage 28 or tensioning unit 33, or both, and rolling or sliding the same either forwardly or backwardly along the track as may be required.

The wire ropes 21 correspond to those ordinarily used with rope-suspended belt conveyors, and the conveyor idlers are secured thereto in mutually spaced relationship along their lengths in the usual manner. The ropes are conveniently used in lengths of from about 250 feet to about 300 feet and are securely fastened at their ends in some suitable manner, as by means of anchors 34, FIGS. 1, 2, 9 and 10, clamped to the rails 10. At anchor points intermediate the length of the track, as in FIGS. 9 and 10, where the ends of adjoining lengths of rope overlap, the supporting standards 20–1 common to both lengths are reinforced by gusset plates 35. Turnbuckles 36 enable proper tensioning of each length of wire rope.

As previously mentioned, it is a feature of the invention that each end of a wire rope length is anchored at least a predetermined distance from the adjacent standard carrying such length. This has been found necessary to overcome force components tending to lift the track from the ground during conveyor operation.

The distance is selected in each instance so that the vertically downward force component effective at the anchor point and attributable to the weight of the structure is at least equal to—but preferably greater than, by from 100 to 200 pounds—the vertically upward force component effective in opposition thereto at such anchor point due to the load on the conveyor.

The following calculations, based on the force diagram of FIG. 11, are applicable to the selection of such distance:

Vertical counteracting component $= D$ (a) (Wt. lbs./ft. of rail) (Distance in ft. between stands) $=$ lbs.

(b) (Wt. lbs./ft. of crosstie) $\dfrac{\text{(Length of tie in feet)}}{2} =$ lbs.

(c) $\dfrac{\text{Wt. lbs. of one conveyor stand}}{2} =$ lbs.

(d) (Wt. lbs./foot of belt) $\dfrac{\text{(Dist. between stands in feet)}}{2} =$ lbs.

(e) $\dfrac{\text{Wt. in lbs. of return idler at conveyor stand}}{2} =$ lbs.

(f) $\dfrac{\text{Total wt. lbs. of carrying idlers between stands}}{2} =$ lbs.

$$D = a + b + c + d + f = \text{lbs.}$$

$$\sin \phi = \frac{D}{T}$$

$$X = \frac{H}{\tan \phi}$$

$H =$ Ht. of post in ft.
$D =$ Vertical down component
$U =$ Vertical up component
$T =$ Rope tension
$X =$ Minimum distance From the above it can be seen that "D" represents the minimum downward, vertical force on the rails, exerted at a connection of rail and tie, that will have to be counteracted if the tie is to be lifted from the ground.

It should be realized that wood ties could be used for the trackway, round spikes being substituted for the bolts 12 as pivotal securement of rails to ties.

Whereas there is here illustrated and described a certain preferred construction of apparatus which we presently regard as the best mode of carrying out our invention, it should be understood that various changes may be made without departing from the inventive concepts particularly pointed out and distinctly claimed herebelow.

We claim:

1. A skid-mounted, movable, belt conveyor, comprising a series of ties arranged as skids; a pair of rails; means pivotally securing said rails to said ties as a track and permitting pivotal relative movement between rails and ties; pairs of wire-rope-supporting standards secured to and rising from respective ties; wire ropes extending from standard to standard lengthwise of said rails; belt-troughing idlers extending transversely of said wire ropes and secured thereto in mutually spaced relationship; an endless conveyor belt having its working run supported by said idlers; head and tail pulleys for said conveyor belt; supporting structures for the respective pulleys; idlers for the return run of said conveyor belt; and means rigidly securing adjacent ties together at one end of said track to prevent relative longitudinal displacement of the rails, the remaining ties being free to move relative to the one another.

2. The combination set forth in claim 1, wherein one of the supporting structures for head and tail pulleys includes a wheeled carriage movable on the rails of the track but normally anchored in position.

3. The combination set forth in claim 1, wherein the supporting structures for head and tail pulleys include wheeled carriages, respectively, movable on the rails of the track; wherein there is additionally provided a belt tensioning unit mounted on said track in association with one of said carriages; and wherein means are provided normally anchoring the other of said carriages to said rails.

4. The combination set forth in claim 1, wherein the wire ropes are anchored at their ends at respective locations adjacent connections between rail and tie and removed from the respective standards carrying the respective ropes by distances such that the downwardly directed vertical force components at the respective anchor points at least equal the upwardly directed vertical force components thereat during operation of the conveyor.

5. The combination set forth in claim 1, wherein the means pivotally securing the rails and ties of the track include pivotal fasteners secured to the respective ties and extending through one flange of each rail, and securement clips fastened to the respective ties and clamping the other flange of each rail to the respective ties.

6. A skid-mounted, movable, belt conveyor, comprising a movable track made up of a series of ties, a pair of rails, means pivotally securing said rails to the ties whereby the ties are fixed along the length of the rails, said ties being widely spaced relative to the spacing of the rails and being arranged as skids for lateral shifting of the track; means effecting the pivotal securement of rails to ties, and means rigidly securing adjacent ties together at one end of said track, the remaining ties being free to move relative to one another; and a rope-suspended, belt conveyor rigidly mounted on the ties for lateral shifting therewith.

7. The combination set forth in claim 6, wherein the means pivotally securing said rails to said ties of the track include pivotal fasteners secured to the respective ties and extending through one flange of each rail, and securement clips fastened to the respective ties and clamping the other flange of each rail to the respective ties.

References Cited in the file of this patent

UNITED STATES PATENTS

| | | |
|---|---|---|
| 2,773,257 | Craggs et al. | Dec. 4, 1956 |
| 3,053,200 | Hayes | Sept. 11, 1962 |

FOREIGN PATENTS

| | | |
|---|---|---|
| 1,063,627 | France | Dec. 16, 1953 |
| 961,875 | Germany | Apr. 11, 1957 |
| 1,008,199 | Germany | May 9, 1957 |